United States Patent
McAlinden et al.

(10) Patent No.: US 8,286,911 B2
(45) Date of Patent: Oct. 16, 2012

(54) FITTING FOR PIVOTALLY CONNECTING AERODYNAMIC CONTROL ELEMENT TO AIRCRAFT STRUCTURE

(75) Inventors: Jon McAlinden, Bristol (GB); Kim Sharp, Bristol (GB)

(73) Assignee: Airbus Operations Limited, Bristol (GB)

( * ) Notice: Subject to any disclaimer, the term of this patent is extended or adjusted under 35 U.S.C. 154(b) by 613 days.

(21) Appl. No.: 12/370,619

(22) Filed: Feb. 13, 2009

(65) Prior Publication Data

US 2009/0218450 A1 Sep. 3, 2009

(30) Foreign Application Priority Data

Feb. 29, 2008 (GB) .................................. 0803692.3

(51) Int. Cl.
*B64C 1/00* (2006.01)
*B64C 23/00* (2006.01)

(52) U.S. Cl. .................. 244/39; 244/123.1; 244/117 R; 244/198; 244/213

(58) Field of Classification Search .................. 244/34, 244/35, 39, 99.2–99.4, 117, 123.1, 131, 198, 244/201, 213, 215
See application file for complete search history.

(56) References Cited

U.S. PATENT DOCUMENTS

| | | | | |
|---|---|---|---|---|
| 2,112,154 | A * | 3/1938 | Hall | 244/216 |
| 4,471,927 | A * | 9/1984 | Rudolph et al. | 244/215 |
| 4,479,620 | A * | 10/1984 | Rogers et al. | 244/195 |
| 7,063,292 | B2 * | 6/2006 | Perez-Sanchez | 244/216 |
| 7,484,694 | B2 * | 2/2009 | Perez-Sanchez | 244/214 |
| 7,631,840 | B2 * | 12/2009 | Kallinen et al. | 244/213 |
| 7,766,282 | B2 * | 8/2010 | Kordel et al. | 244/215 |
| 2002/0100840 | A1 * | 8/2002 | Billinger et al. | 244/131 |
| 2005/0061922 | A1 * | 3/2005 | Milliere | 244/213 |
| 2007/0252040 | A1 * | 11/2007 | Kordel et al. | 244/123.1 |
| 2008/0156936 | A1 * | 7/2008 | McBroom | 244/123.1 |
| 2009/0001225 | A1 * | 1/2009 | Libby | 244/35 R |
| 2009/0072090 | A1 * | 3/2009 | Kallinen et al. | 244/131 |
| 2009/0127406 | A1 * | 5/2009 | McDonald | 244/90 R |
| 2009/0146016 | A1 * | 6/2009 | Kordel et al. | 244/215 |
| 2009/0321575 | A1 * | 12/2009 | Barroso Vloedgraven et al. | 244/131 |
| 2010/0032520 | A1 * | 2/2010 | Mauran et al. | 244/99.4 |
| 2010/0327121 | A1 * | 12/2010 | McAlinden et al. | 244/215 |
| 2011/0031349 | A1 * | 2/2011 | Wildman et al. | 244/123.1 |

FOREIGN PATENT DOCUMENTS

| | | |
|---|---|---|
| EP | 0239138 A2 | 9/1987 |
| EP | 0947421 A1 | 10/1999 |
| EP | 1764303 A2 | 3/2007 |
| WO | 2007096624 A2 | 8/2007 |

OTHER PUBLICATIONS

UK Search Report for GB0803692.3 dated Apr. 29, 2008.

* cited by examiner

*Primary Examiner* — Benjamin P Lee
*Assistant Examiner* — Joshua Freeman
(74) *Attorney, Agent, or Firm* — Lowe, Hauptman, Ham & Berner, LLP (57) ABSTRACT

A method of installing an aerodynamic control element on an aircraft structure. The method comprising: attaching a fitting to the aircraft structure, the fitting comprising a pair of hinge ribs extending away from the aircraft structure and a spacer extending between the pair of hinge ribs; maintaining a desired distance between the pair of hinge ribs with the spacer as the fitting is attached; and pivotally mounting the aerodynamic control element to each hinge rib via a respective hinge.

15 Claims, 7 Drawing Sheets

FITTING FOR PIVOTALLY CONNECTING AERODYNAMIC CONTROL ELEMENT TO AIRCRAFT STRUCTURE

RELATED APPLICATIONS

The present application is based on, and claims priority from, British Application Number 0803692.3, filed Feb. 29, 2008, the disclosure of which is hereby incorporated by reference herein in its entirety.

FIELD OF THE INVENTION

The invention relates to a fitting for pivotally connecting an aerodynamic control element to an aircraft structure; a method of installing a control element using such a fitting; and an aircraft assembly incorporating such a fitting.

BACKGROUND OF THE INVENTION

Traditionally, the support structure between the wing flight controls and the spar/skin overhang on a large passenger aircraft consists of metallic 'A-frame' hinge ribs. These hinge ribs are traditionally formed from an aluminium alloy, attached to upper panels which overhang the rear spar of the wing, and their leading edge is in abutment with the rear spar. Interface loads from the flight control surface and air pressure loads are reacted by the hinge ribs into the rear spar of the wing and into the upper panels. The upper panels are normally made of composite materials and they provide stability to the hinge ribs.

Figure 1:
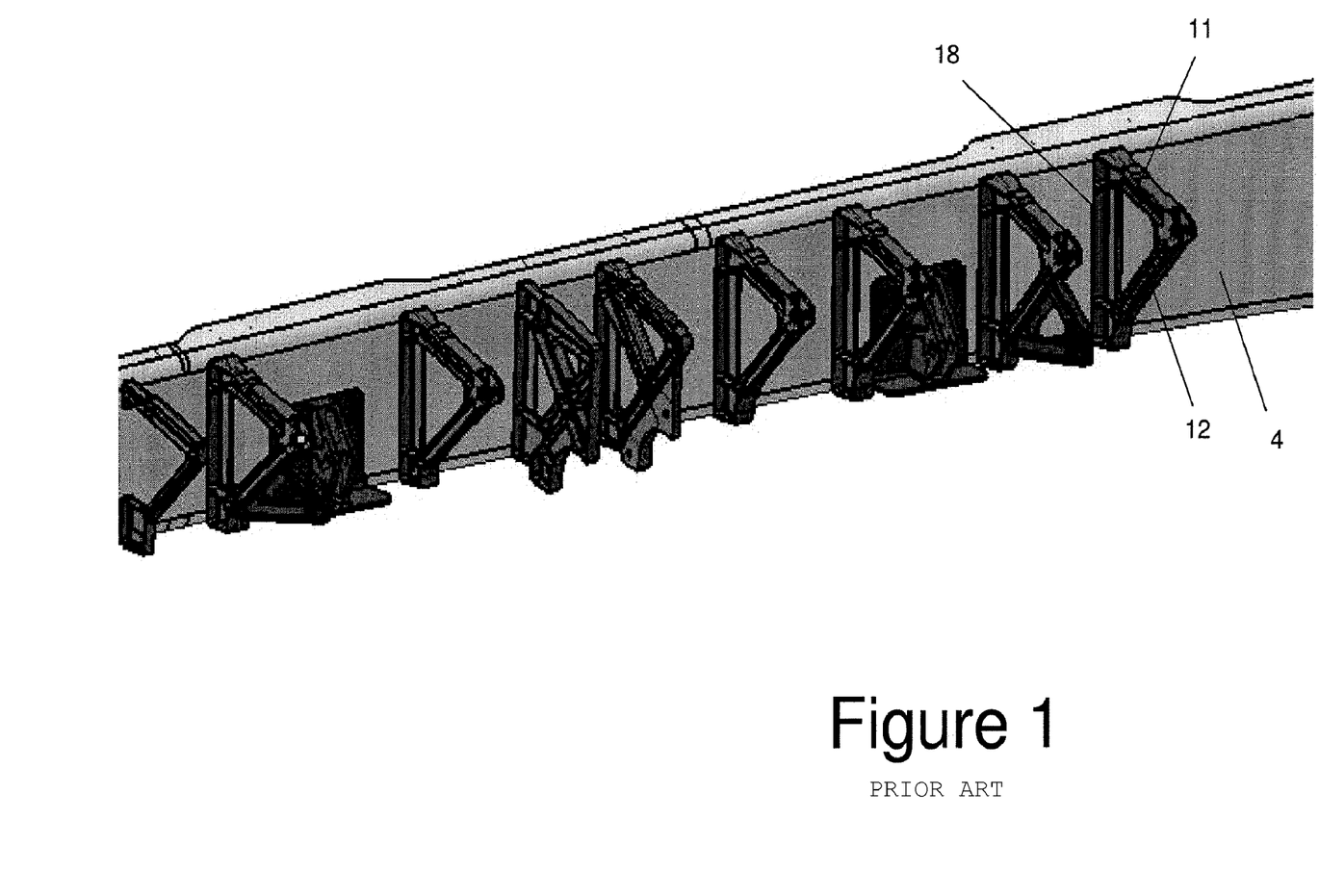
FIG. 1 shows a line of conventional one-part hinge ribs attached to a rear spar web.

FIG. 1 shows a line of such hinge ribs, each attached to the web 4 of a C-section rear spar. Note that the upper and lower covers and the spoiler are omitted in FIG. 1. Each hinge rib comprises a base 18 which extends between upper and lower hinge rib arms 11, 12 and is attached to the spar web 4.

A problem with conventional designs is that the distance between adjacent hinge ribs is difficult to control accurately during installation.

SUMMARY OF THE INVENTION

A first aspect of the invention provides a method of installing an aerodynamic control element on an aircraft structure, the method comprising: attaching a fitting to the aircraft structure, the fitting comprising a pair of hinge ribs extending away from the aircraft structure and a spacer extending between the pair of hinge ribs; maintaining a desired distance between the pair of hinge ribs with the spacer as the fitting is attached; and pivotally mounting the aerodynamic control element to each hinge rib via a respective hinge.

A second aspect of the invention provides a fitting for pivotally connecting an aerodynamic control element to an aircraft structure, the fitting comprising a pair of hinge ribs each adapted to be pivotally connected to the control element; and a spacer extending between the pair of hinge ribs.

A third aspect of the invention provides an aircraft assembly comprising: an aircraft structure; a fitting according to the second aspect of the invention attached to the aircraft structure; and an aerodynamic control element pivotally connected to each hinge rib by a respective hinge.

The spacer ensures an accurate distance is maintained between the hinge ribs during installation. The spacer may be removed after installation, or more preferably remains in place in order to maximise the stiffness of the assembly.

The spacer may be integrally formed as a single piece with the pair of hinge ribs, or formed as a separate part before being attached to the hinge ribs.

The fitting may be adapted in a variety of ways in order to be pivotally connected to the control element. For instance each hinge rib may have a projection which extends along the hinge line and is received in a hole in the control element (or vice versa). Alternatively the control element may comprise two pairs of clevis arms, each clevis arm having a hole for receiving a hinge pin, and each hinge rib being received between a respective pair of clevis arms and having a hole for receiving the hinge pin. In the preferred embodiment described below each hinge rib comprises a pair of clevis arms, each clevis arm having a hole for receiving a hinge pin.

Typically the hinge rib is attached to a spar of the aircraft structure. Optionally the hinge rib may be attached to one or more covers which are attached to the rear spar and overhang to its rear. In this case each hinge rib may comprise a continuous web which is attached to both covers; a hinge rib arm attached to one of the covers only; or a first hinge rib arm and a second hinge rib arm, each attached to a respective one of the covers. In the latter case, typically the first hinge rib arm extends longitudinally at an acute angle to the second hinge rib arm.

Most typically the aircraft structure comprises an aerofoil such as a main wing element or horizontal tail plane. Alternatively the aircraft structure may comprise a vertical tail plane or other element of an aircraft.

The aerodynamic control element may comprise a flap, spoiler, aileron, elevator, rudder, or any other control element pivotally attached to the trailing edge of an aircraft structure.

DESCRIPTION OF FIGURE(S)

Embodiments of the invention will now be described with reference to the accompanying drawings, in which.

DETAILED DESCRIPTION OF EMBODIMENT(S)

Figure 2:
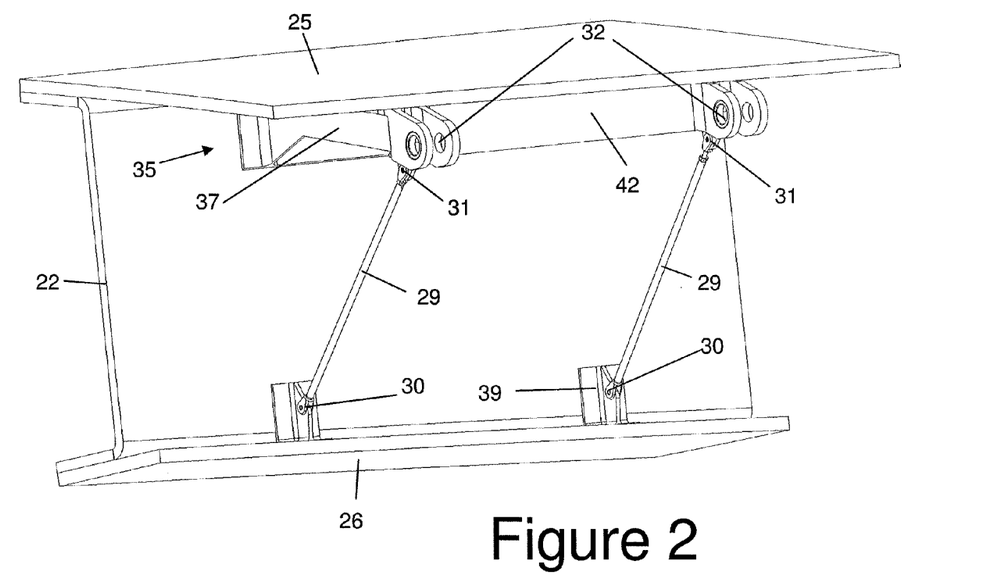
FIGS. 2 and 3 are perspective views of a double hinge rib assembly attached to the trailing edge of an aircraft wing.
Figure 3:
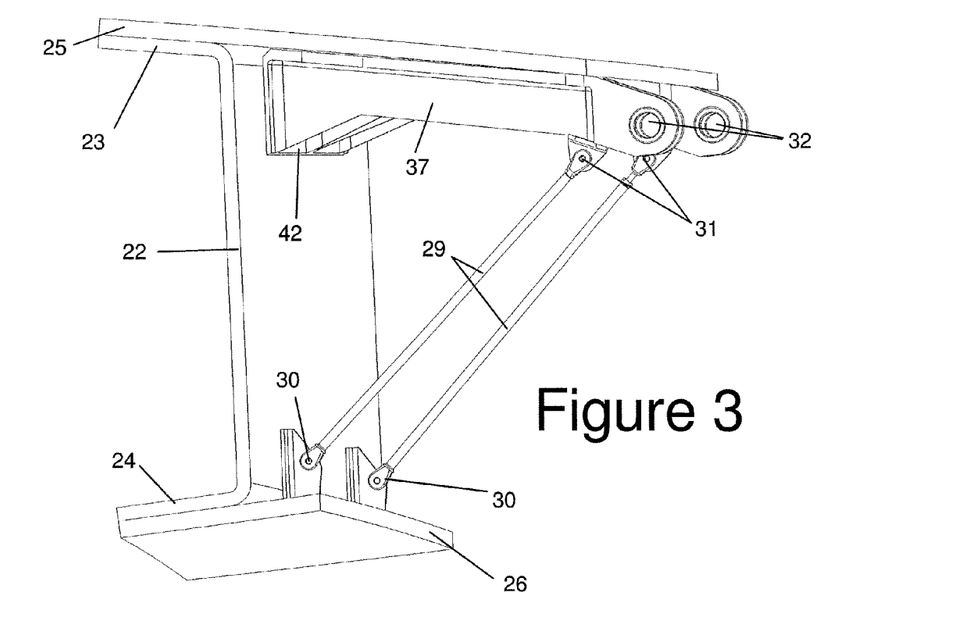
Figure 6:
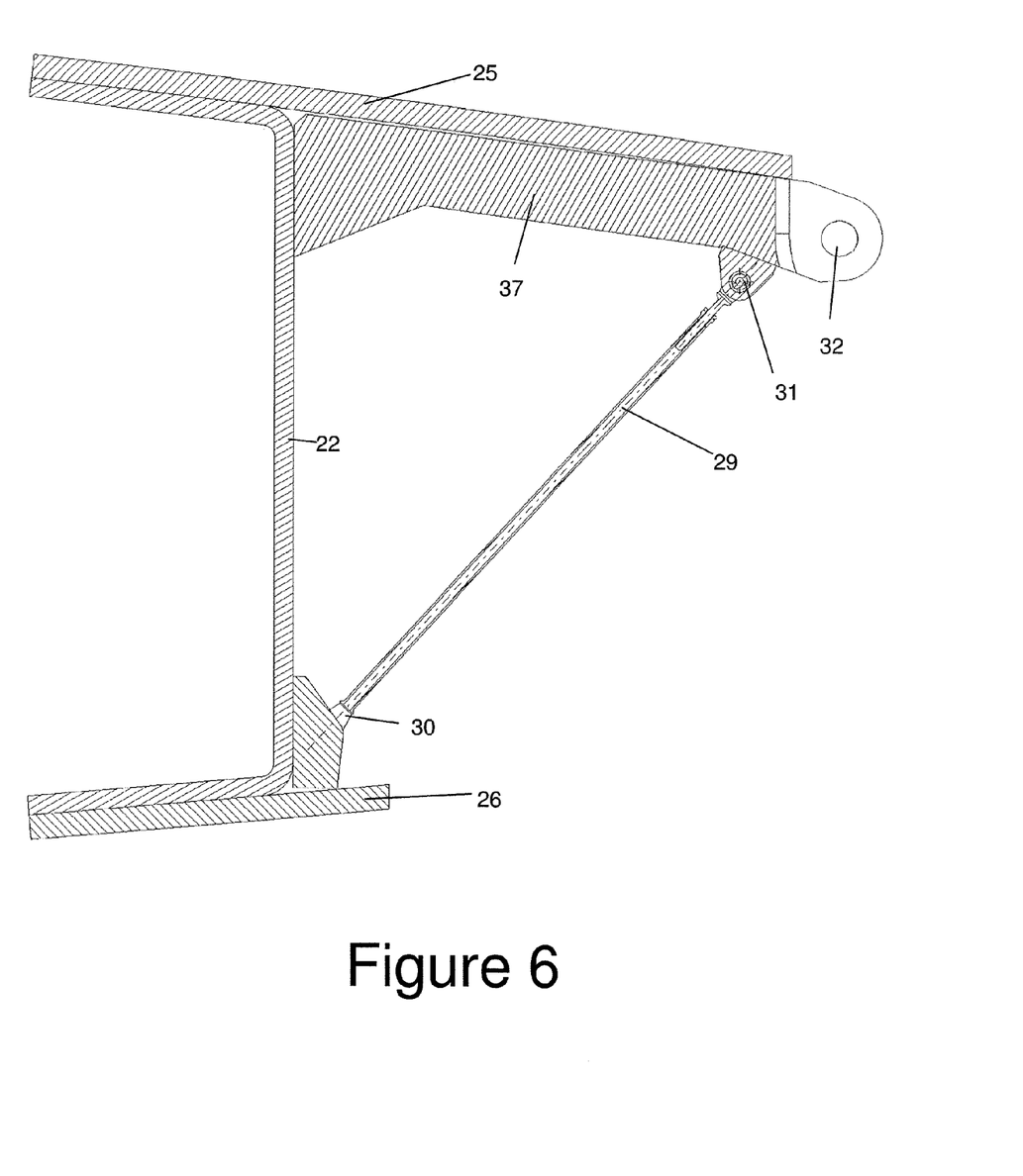
FIG. 6 is a sectional side view of the double hinge rib assembly.

FIGS. 2, 3 and 6 show part of the trailing edge of a wing comprising a C-section rear spar with a web 22 and upper and lower flanges 23, 24. Composite upper and lower covers 25, 26 are attached to the upper and lower flanges. A variety of types of composite material may be used, but most typically the covers are formed from a laminar composite material, each ply comprising a set of unidirectional carbon fibres impregnated with an epoxy resin matrix. The covers each extend forward of the spar flanges to form the upper and lower boundaries of a wing box (not shown). They also extend aft of the spar web to form respective overhanging portions shown in FIGS. 2, 3 and 6. A hinge rib assembly connects a spoiler 70 (shown in FIG. 9) to the overhanging portions of the upper and lower covers 25, 26 and to the spar web 22.

Figure 4:
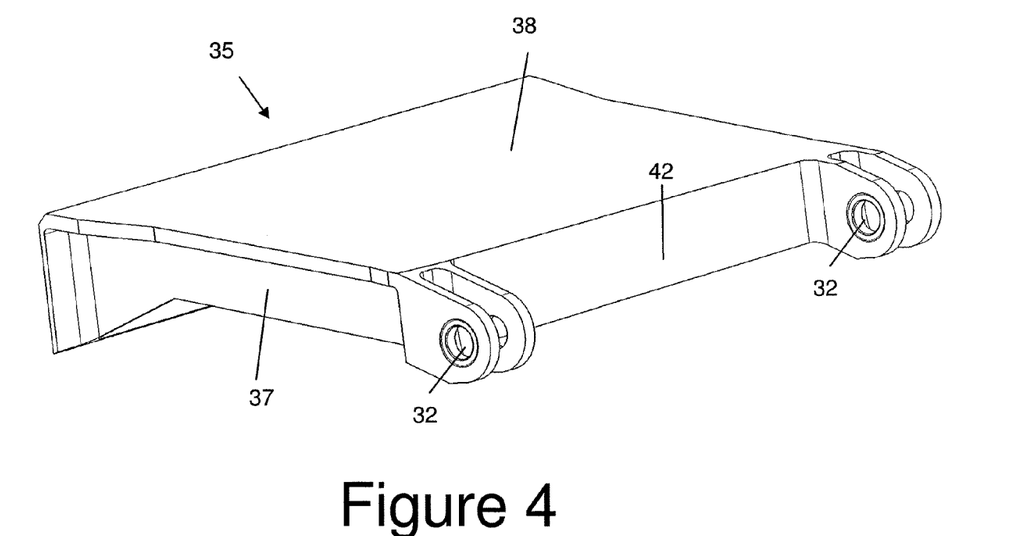
FIG. 4 shows the fitting viewed from above.
Figure 5:
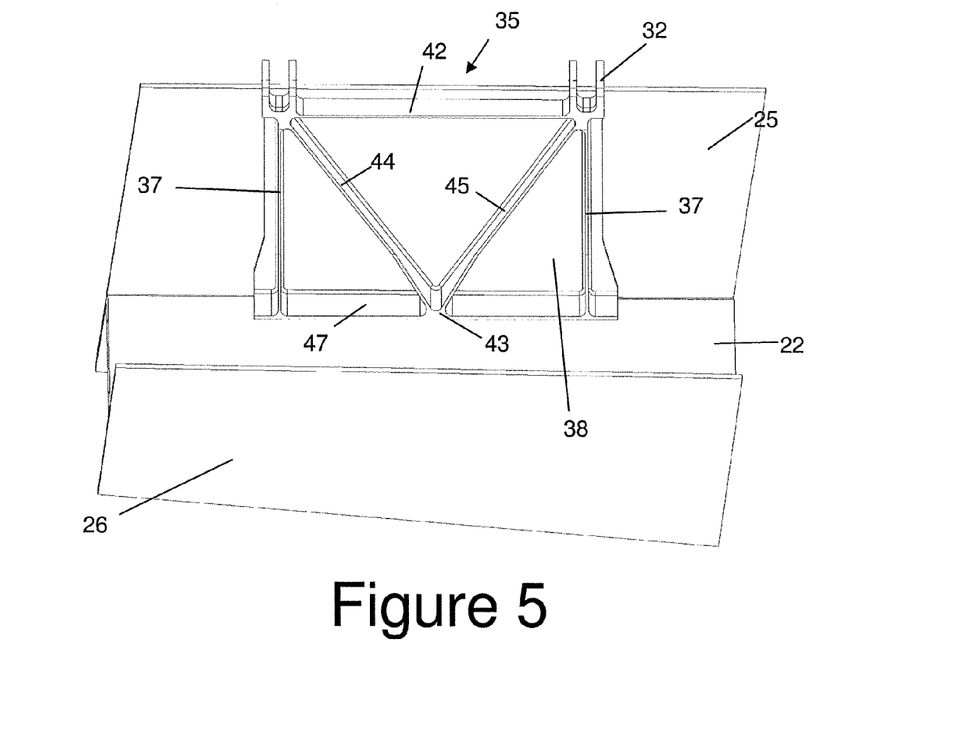
FIG. 5 shows the fitting viewed from below.

The hinge rib assembly comprises a fitting 35 shown in detail in FIG. 4 and a pair of rods 29 which extend longitudinally at an acute angle to the fitting 35 to form a so-called "A-frame" shape. The fitting 35 comprises a pair of upper arms 37 which are formed as a single piece with a web 38 which extends between the arms 37 and is attached to the upper cover 25 by fasteners (shown schematically by lines 72 in FIG. 9). Stiffening flanges 42, 47, 44, 45 extend from the underside of the web 38 as shown most clearly in FIG. 5. The front flange 47 extends span-wise between the feet of the two upper hinge rib arms 37 and is attached to the spar web 22 by fasteners (shown schematically by lines 73 in FIG. 9).

The fitting 35 carries a pair of lugs each of which forms a clevis joint 31 with a respective rod 29. Note that these lugs are omitted in FIGS. 4 and 5 for purposes of clarity.

Each rod 29 has a clevis at its foot which is pivotally connected to a bracket 39 at a clevis joint 30. The bracket 39 is attached by fasteners (not shown) to the overhanging portion of the lower cover 26 and to the spar web 22.

The web 38 and flanges 42, 47, 44, 45 together act as a spacer, maintaining a desired distance between the arms 37 as the fitting 35 is attached. The design of the spacer between the arms 37 is not restricted to the form described here and may take any other suitable form. For example, the flanges 44, 45 may be connected from the midpoint of flange 42 to the feet of respective hinge rib arms 37 or they may be omitted altogether.

The webs 38 and flanges 42, 47, 44, 45 also increase the stiffness of the assembly and assist in absorbing loads from the spoiler.

To reduce the weight of the wing, the overhanging portion of the upper cover 25 may be ramped down in thickness aft of the rear spar web 22. To take advantage of the strength of the upper cover overhang, the hinge rib assembly is designed to channel more load into the upper cover 25 than into the rear spar web 22. To achieve this, the portion of the fitting 35 in contact with the upper cover 25 has a larger surface area than the portion of the fitting 35 in contact with the rear spar web 22.

An advantage of transferring a higher proportion of the load into the cover is that significant weight savings (as well as material cost savings) can be achieved. This is because the rods 29 are not required to channel as much load as their equivalent part in existing designs. Therefore, they do not have to be as robust and are therefore lighter than the upper hinge rib arms 28. The rods 29 may be a standard part used in other parts of the aircraft which allows further cost savings to be achieved. Alternatively, the rods 29 may be omitted altogether. It may also be possible to reduce the thickness of the overhanging portion of the lower cover 26 as it is no longer required to absorb as much load. This would lead to further weight and material cost savings.

The fitting 35 may be formed from a metallic material, such as aluminium or an aluminium alloy. Alternatively, the fitting 35 may be formed from the same composite material as the composite cover 25 and either:
  bonded to the upper cover 25 rather than using fasteners;
  formed as a separate part as the cover 25 and then co-cured to the cover 25; or
  formed integrally with the cover 25.

Figure 7:
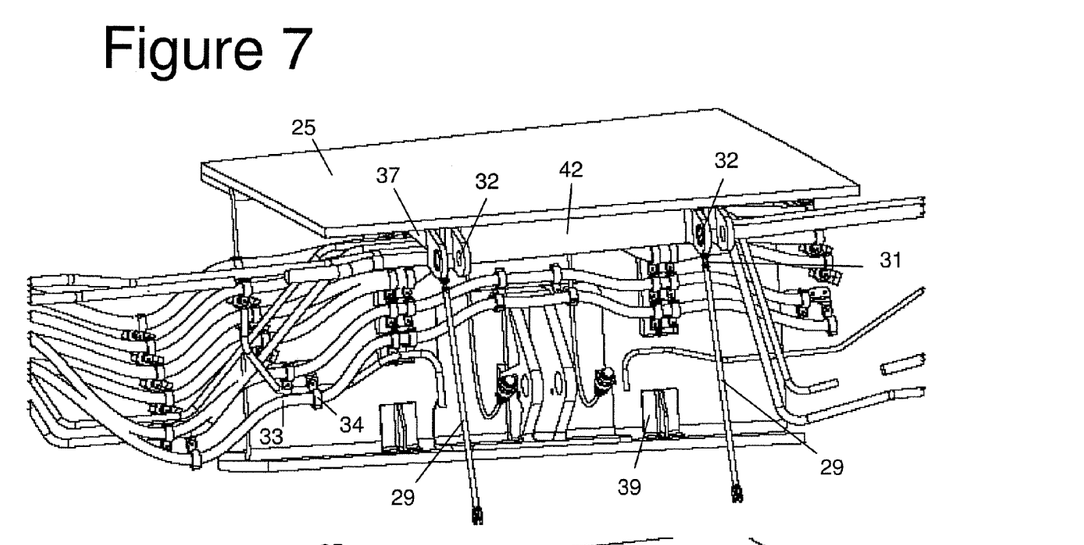
FIG. 7 is a rear view of the double hinge rib assembly in a partially installed state and also showing systems carried by the rear spar.
Figure 8:
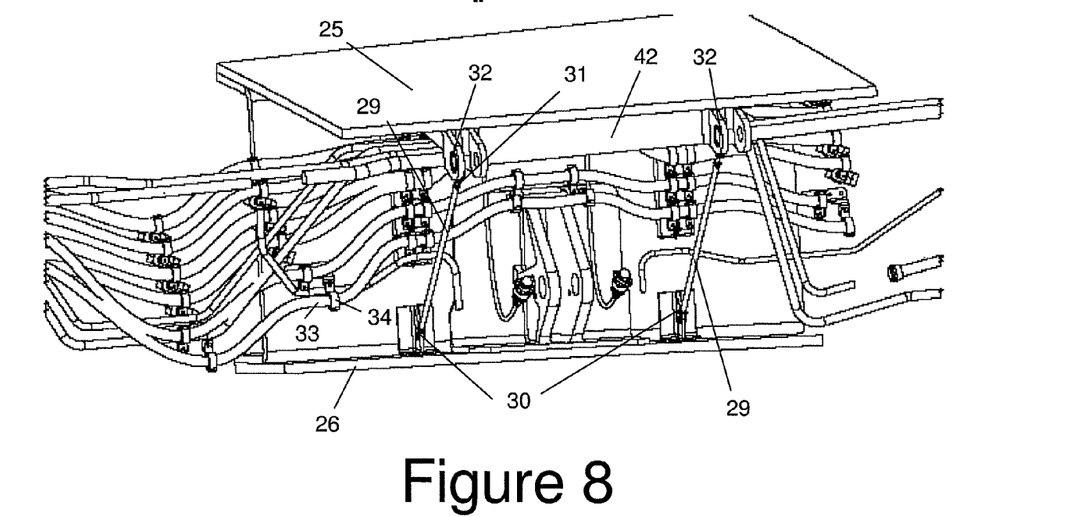
FIG. 8 shows the view of FIG. 7 but with the rods attached to the spar web and lower cover.

A method of installing the hinge rib assembly is illustrated in FIGS. 7 and 8. Electrical cables and hydraulic pipes 33 (collectively referred to below as lines 33) are installed to extend in a span-wise direction along the wing, and fixed to the spar web 22 by clips 34. The fitting 35 is attached to the overhanging portion of the upper cover 25 and to the spar web 22 with fasteners (not shown), either before or after installation of the lines 33. The hinge rib is then assembled by pivotally attaching the rods 29 to the fitting 35 at clevis joints 31 as shown in FIG. 7. Next, the feet of the rods 29 are pivotally attached to the brackets 39 at clevis joints 30 as shown in FIG. 8.

Figure 9:
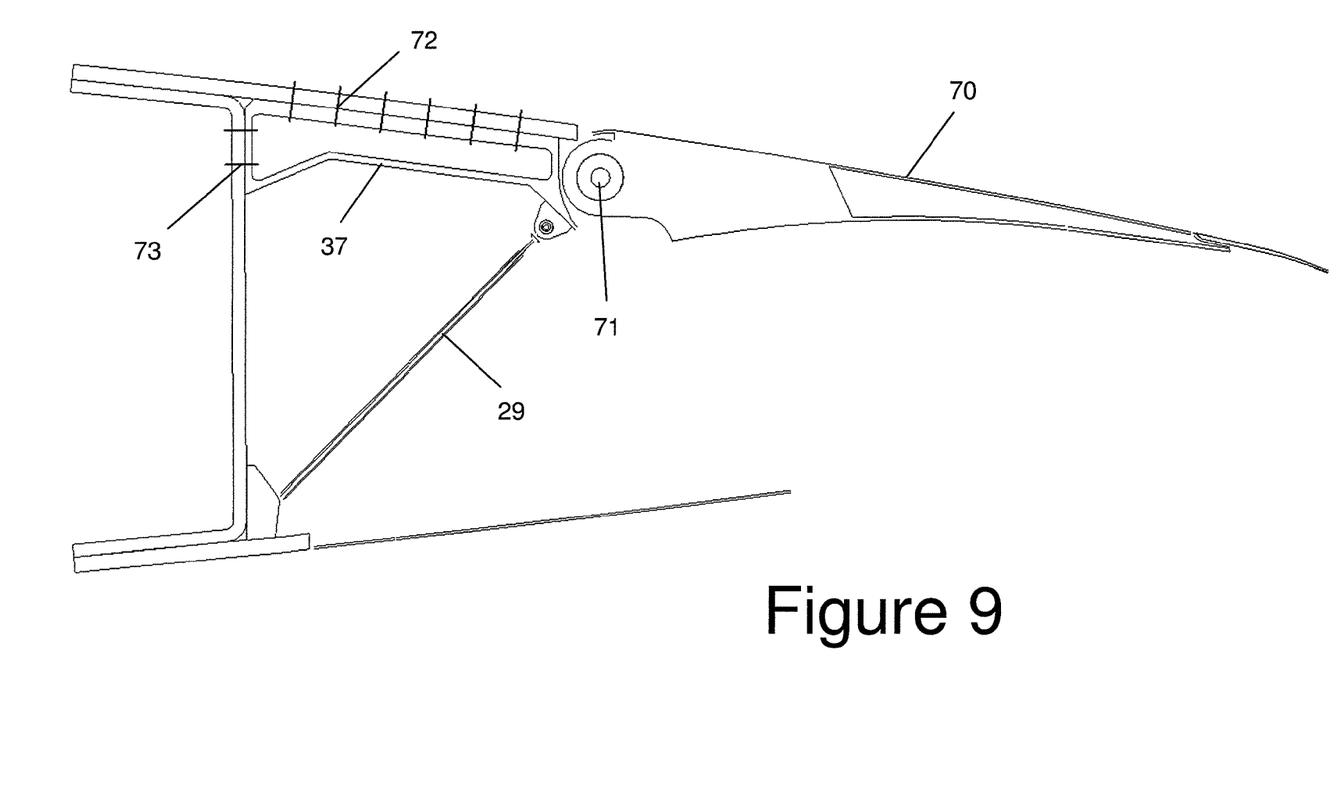
FIG. 9 is a sectional side view showing a spoiler pivotally attached to the trailing edge of an aircraft wing by the hinge rib assembly.

After the hinge rib has been installed as shown in FIG. 8, a spoiler 70 is pivotally mounted to the hinge rib by a pair of pivot pins 71 as shown in FIG. 9, each pivot pin passing through a respective clevis 32.

To replace or repair one of the lines 33 after the hinge rib assembly has been installed, the rods 29 are disconnected from one or both of the clevis joints 30, 31. The rods 29 are then re-attached when repair/replacement is complete.

Furthermore, damaged hinge ribs can be removed without having to move the damaged hinge rib inboard to a point where the spar is sufficiently deep, as with existing one-part hinge ribs. Instead, the hinge rib assembly can be disassembled in-situ by disconnecting the rods 29 from one or both of the clevis joints 30,31 whilst keeping the fitting 35 attached to the upper cover 25. The fitting 35 and/or rods 29 can then be removed directly aft without being trapped by the closed angle between the upper and lower covers 25,26.

Figure 10:
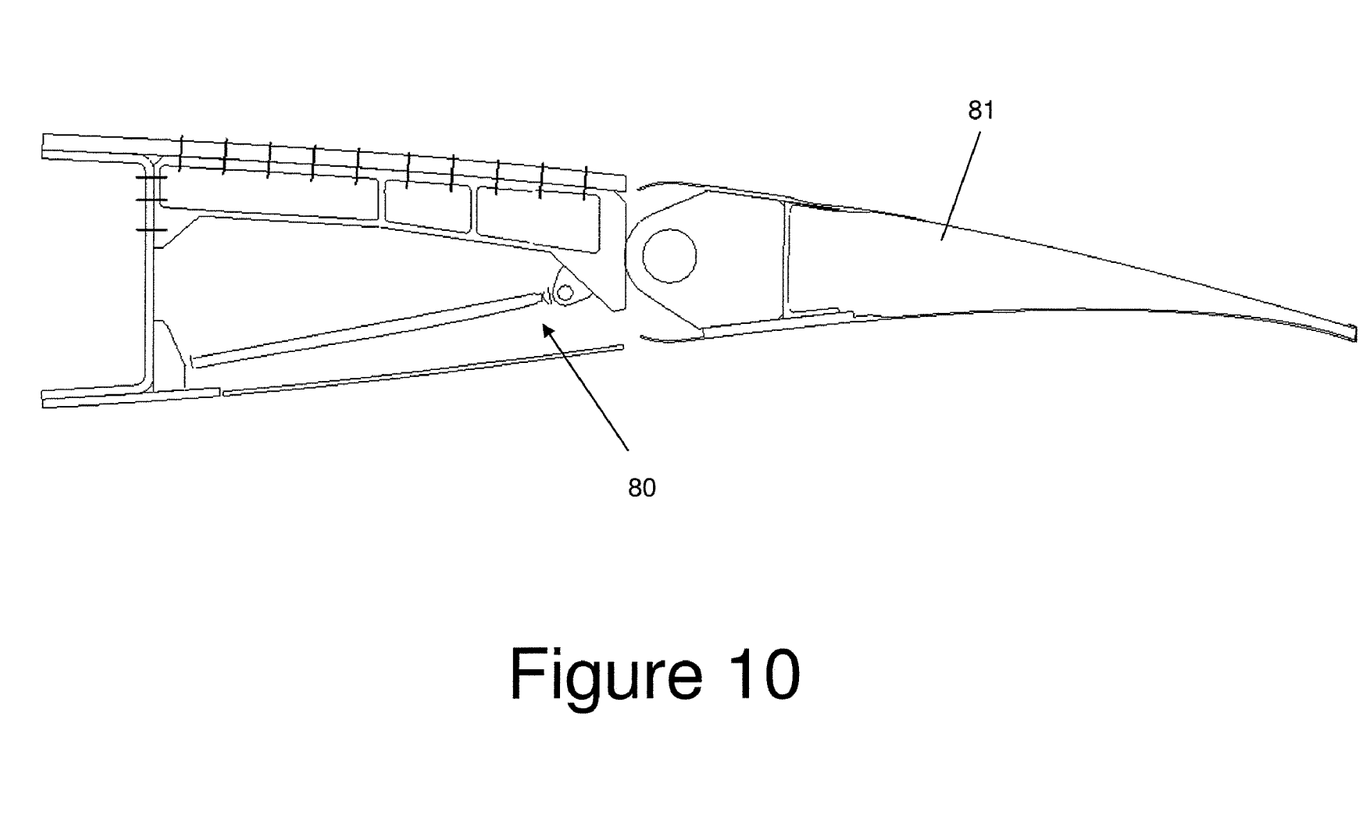
FIG. 10 is a sectional side view showing an aileron pivotally attached to the trailing edge of an aircraft wing by a further hinge rib assembly.

Although the hinge rib described above is used to attach a spoiler to the trailing edge of a wing, the invention is equally applicable to other control surfaces such as ailerons, elevators, rudder or spoilers. By way of example, FIG. 10 shows a hinge rib assembly 80 (similar in construction to the assembly shown in FIGS. 2-9) pivotally mounting an aileron 81 to the trailing edge of a wing.

Although the invention has been described above with reference to one or more preferred embodiments, it will be appreciated that various changes or modifications may be made without departing from the scope of the invention as defined in the appended claims.

The invention claimed is:

1. A method of installing an aerodynamic control element on an aircraft structure, the method comprising:
    attaching a fitting to the aircraft structure, the fitting comprising a pair of hinge ribs extending away from the aircraft structure and a web extending between the pair of hinge rib arms,
    integrally forming said web as a single piece with the pair of hinge ribs;
    maintaining a desired distance between the pair of hinge ribs with the web as the fitting is attached; and
  pivotally mounting the aerodynamic control element to each hinge rib via a respective hinge.

2. The method of claim 1 wherein the fitting is attached to a trailing edge of the aircraft structure.

3. The method of claim 2 wherein the aircraft structure comprises a rear spar and a cover which is attached to the rear spar and overhangs to its rear, the method further comprising attaching each hinge rib to the cover.

4. The method of claim 3 wherein the aircraft structure further comprises a second cover which is attached to the rear spar and overhangs to its rear; the method further comprising attaching each hinge rib arm to the second cover.

5. The method of claim 4 wherein each hinge rib comprises a first hinge rib arm and a second hinge rib arm, the method further comprising: attaching the first hinge rib arm of each hinge rib to the first cover; and attaching the second hinge rib arm of each hinge rib to the second cover.

6. A fitting for pivotally connecting an aerodynamic control element to an aircraft structure, the fitting comprising a pair of hinge ribs each adapted to be pivotally connected to the control element; and a spacer extending between the pair of hinge ribs, wherein the spacer is integrally formed as a single piece with the pair of hinge ribs and wherein the spacer comprises a web extending between the pair of hinge ribs and two or more stiffening flanges extending from the web and extending between the pair of hinge ribs.

7. The fitting of claim 6 wherein each hinge rib comprises a pair of clevis arms, each clevis arm having a hole for receiving a hinge pin.

8. An aircraft assembly comprising:
an aircraft structure;
a fitting attached to the aircraft structure, the fitting comprising a pair of hinge ribs and a web spacer extending between the pair of hinge ribs, wherein the web spacer is integrally formed as a single piece with the pair of hinge ribs; and
an aerodynamic control element pivotally connected to each hinge rib by a respective hinge.

9. The assembly of claim 8, wherein the aircraft structure comprises a rear spar, and a cover which is attached to the rear spar and overhangs to its rear; and
wherein each hinge rib engages the cover.

10. The assembly of claim 9 wherein the web engages the cover.

11. The assembly of claim 10, wherein the aircraft structure further comprises a second cover which is attached to the rear spar and overhangs to its rear; and wherein each hinge rib engages the second cover.

12. The assembly of claim 11 wherein each hinge rib comprises a first hinge rib arm which is attached to the first cover; and a second hinge rib arm which is attached to the second cover.

13. The assembly of claim 12 wherein the first hinge rib arm extends longitudinally at an acute angle to the second hinge rib arm.

14. The assembly of claim 12 wherein the web extends between the first hinge rib arms of each hinge rib.

15. The assembly of claim 8 wherein the fitting is attached to a trailing edge of the aircraft structure.

* * * * *